Aug. 30, 1938.  W. G. HARDING ET AL  2,128,559
GYROSCOPIC COMPASS
Filed May 13, 1936  4 Sheets-Sheet 1
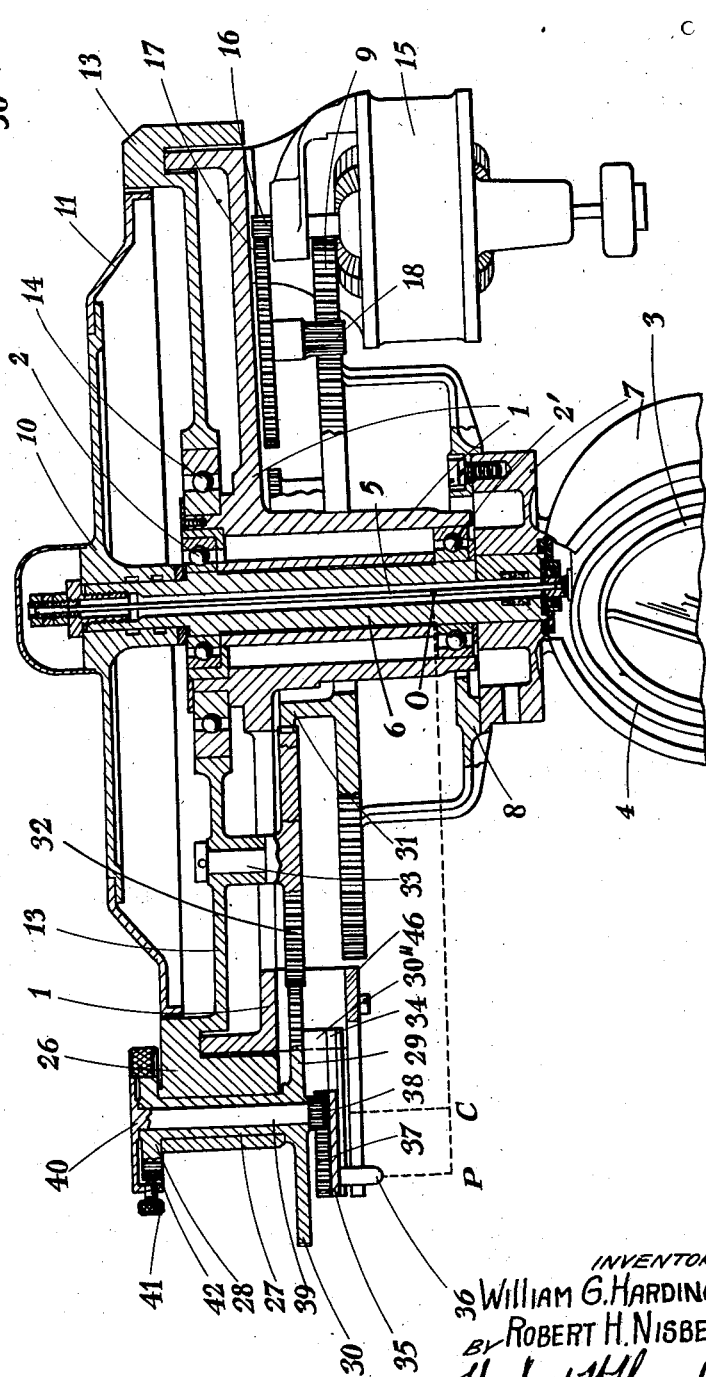
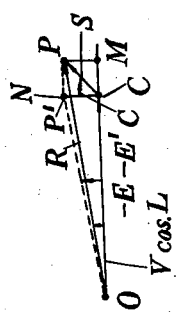
INVENTORS
William G. Harding
Robert H. Nisbet
BY Herbert H. Thompson
THEIR ATTORNEY.

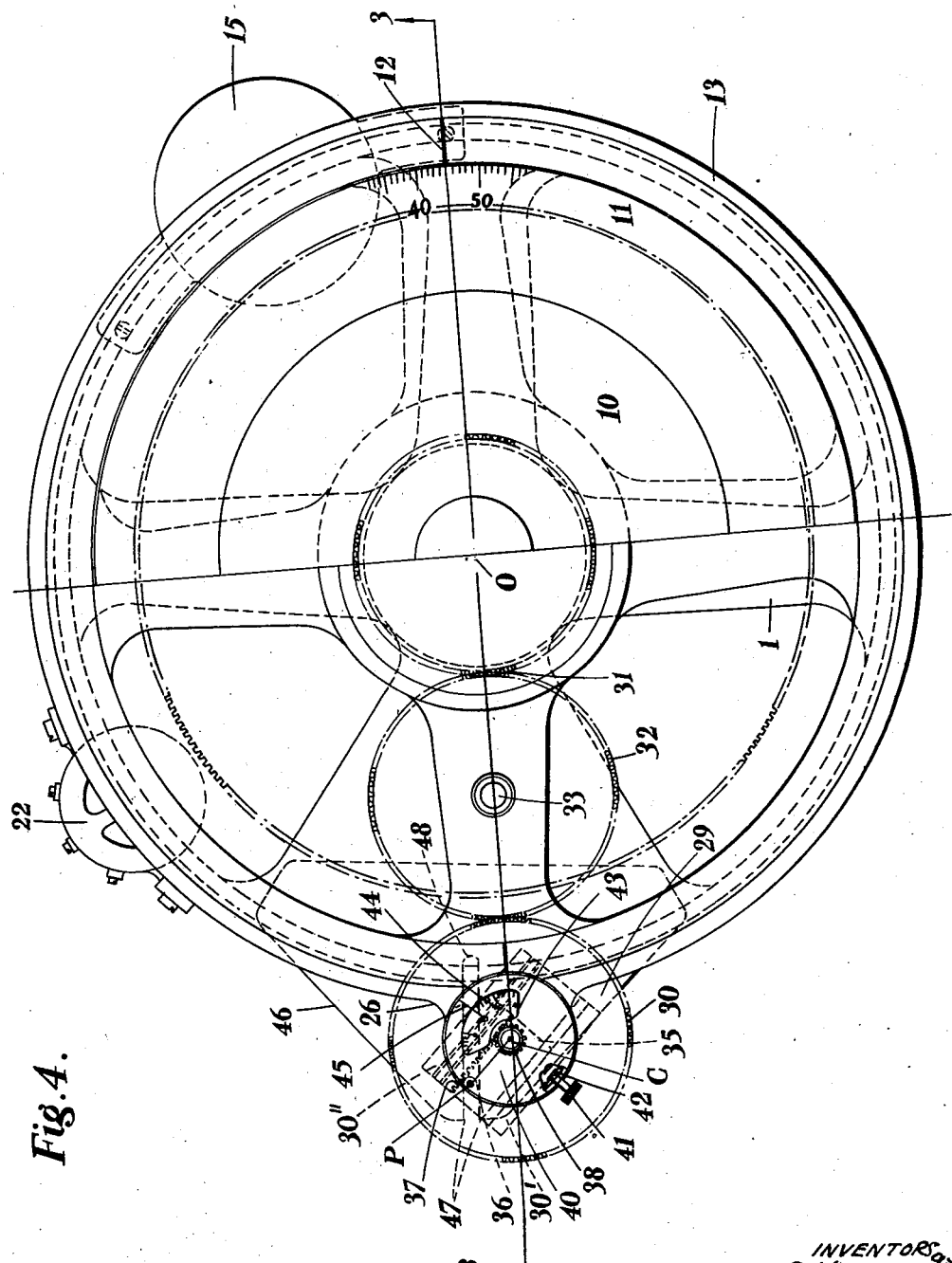

Aug. 30, 1938.   W. G. HARDING ET AL   2,128,559
GYROSCOPIC COMPASS
Filed May 13, 1936     4 Sheets-Sheet 3

INVENTORS
William G. Harding and
By Robert H. Nisbet
Herbert H. Thompson
THEIR ATTORNEY.

Aug. 30, 1938.    W. G. HARDING ET AL    2,128,559
GYROSCOPIC COMPASS
Filed May 13, 1936    4 Sheets-Sheet 4

INVENTORS
WILLIAM G. HARDING
BY ROBERT H. NISBET
Herbert H. Thompson
THEIR ATTORNEY.

Patented Aug. 30, 1938

2,128,559

UNITED STATES PATENT OFFICE 2,128,559

GYROSCOPIC COMPASS

William George Harding, London, and Robert Hayes Nisbet, Osterley, England, assignors to Sperry Gyroscope Company, Inc., Brooklyn, N. Y., a company of New York Application May 13, 1936, Serial No. 79,408
In Great Britain May 15, 1935

9 Claims. (Cl. 33—226)

This invention relates to gyroscopic compasses, and particularly to means for correcting the readings of such compasses when they are carried on a moving vehicle such as a ship.

A gyro compass carried with the earth indicates the true north. This is because the supports of the compass experience a rotation about an axis parallel to the earth's axis. The gyro settles with its axis along the horizontal projection of this axis of rotation of its supports—the true north. If, however, the compass is mounted on a moving vehicle, such as a ship, the motion imparted to its supports is not the same as that of the surface of the earth in its vicinity, but is made up of this motion and of the motion of the ship over the earth's surface. The compass supports are therefore subjected to a total or resultant rotation in space about some axis which is, in general, different from the axis of rotation of the earth. The result is that the compass settles with its axis along the horizontal projection of this axis of total rotation, instead of pointing to the true north. The error measured in the horizontal plane is called the speed error.

The present invention relates to means for correcting the readings of the compass to compensate for this speed error. The subject matter of the present invention is similar to that disclosed in the prior United States Patent No. 1,255,480, but the object of the present invention is to provide novel means for mechanically calculating and applying the correction and for calculating such correction according to a more accurate formula than has hitherto been used.

The formula usually accepted for the speed error may be expressed in the form $$\tan E = \frac{-S \cos C}{V \cos L}$$

where E is the speed error, or the angle measured clockwise from the true north to the gyro axis. C is the course angle of the ship measured clockwise from the true north. S is the speed of the ship over the earth's surface. V is the component of the surface speed of the earth at the equator due to the earth's rotation about its axis once in a sidereal day, and L is the latitude of the ship.

Disregarding signs and also the difference between an angle in radians and its tangent, the formula can be expressed in numerical form.

Error in degrees $= .0635 \times$ knots $\times \cos C \times \sec L$.

The above formulae are drived from a consideration of the ratio of the northward component of the ship's speed to the eastward speed of the earth's surface in the latitude of the ship. They entirely neglect the east-west component of the ship's speed over the earth's surface. The true formula, taking this component into account, is $$\tan E = \frac{-S \cos C}{V \cos L + S \sin C}$$

The incorrect formula makes it appear that, for a ship travelling at a given speed, the compass error is greatest for courses due north and due south. The true formula shows that the error is greatest for courses to the west of due north or due south.

Broadly stated we provide according to the present invention means for mechanically calculating a correction according to the true formula as above stated or to mathematical transformations of it. The results obtained therefore differ from those obtained with previous correctors in taking account of the second term of the denominator in the true formula; they also differ in taking account of the differences between E expressed in radians and tan E. Both differences, though small for small corrections, begin to assume importance when the correction angle is large, as occurs with high speeds at high latitude.

The devices used in our invention are intended to be set, either manually or by automatic means not falling within the scope of the invention, in accordance with the ship's speed and latitude. Thereafter the devices are automatic in the sense that when the ship changes course the correction is automatically changed in accordance with the formula. In order that the devices may be automatic in this sense they are subjected to the action of members turning relatively to each other through the same angle as the change of course. Such relatively moving members are found naturally in the compass itself or in repeater compasses. The correction when calculated by the devices of our invention may be used in any suitable part of the compass, or in repeater compasses, or in a transmission system from the compass to repeater compasses.

More specifically stated, therefore, a feature of the present invention is the provision of means operated from a gyro compass or its equivalent to calculate a correction according to the formula $$\tan E = \frac{-S \cos C}{V \cos L + S \sin C}$$

or to mathematical transformations of this formula.

Another feature is the mechanical application of a correction according to this formula to a gyro compass or to repeater compasses, or to transmitters.

A further feature is the provision of means adapted to make the speed correction given by the above formula unaffected by other corrections given to a gyro compass.

A still further feature is the provision of means adapted to provide corrections for the speed errors of a gyro compass or the like which correct the error in accordance with a formula taking into account the east or west component of the ship's velocity.

The invention will now be more particularly described with reference to the accompanying drawings in which:

Figure 1 is a velocity diagram—explaining the difference between the formula hitherto employed in compass correctors and the formula employed in the present invention.

Figure 2 is a diagram showing the geometrical principles employed in the present invention for calculating the correction.

Figure 3 is a sectional elevation of the upper part of a gyro compass embodying one form of our invention, the section being taken along the line 3—3 of Figure 4.

Figure 4 is a plan view of the same compass.

Figure 5 is a part elevation showing more clearly some details of an adjustable slide used in the corrector device of Figures 3 and 4.

Figure 6:
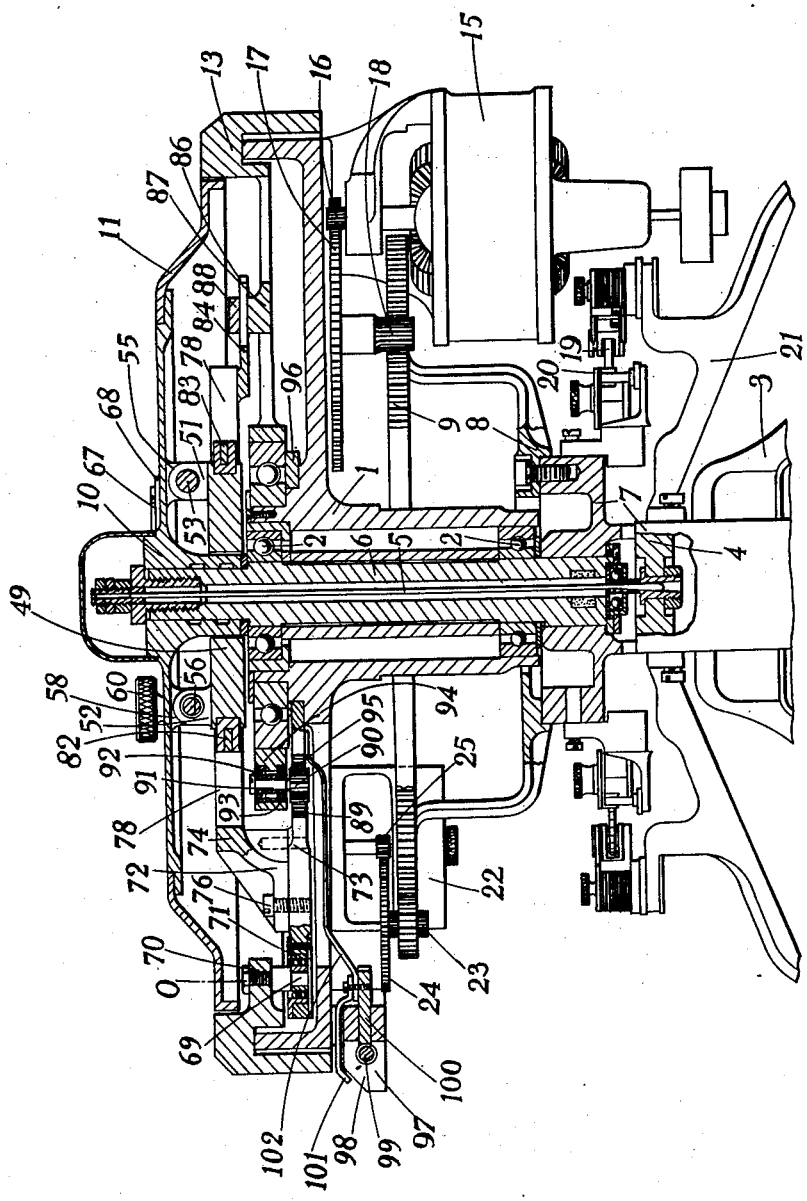
Figure 6 is a sectional elevation of the upper part of a compass incorporating another form of the invention, the section being taken on the line 6—6 of Figure 7.

Referring to Figure 1, OCP is a triangle of velocities. OC represents that part of the velocity of a point on the earth's surface in latitude L which is due to the rotation of the earth about its axis once in a sidereal day. A ship is supposed to be situated at this point and to have a velocity S relative to the earth's surface, in the direction of the ship's heading. This velocity is represented by CP.

The earth's velocity OC is from west to east and is of magnitude V cos L where V is the velocity of rotation of a point on the earth's equator. The line CN perpendicular to OC therefore represents the true north and the angle NCP is the course angle C of the ship.

The line OP which is the vector sum of OC and CP, therefore, represents the resultant velocity of the ship over a non-rotating sphere coincident with the earth's surface. It makes the angle COP with the velocity OC due to the earth's rotation alone. A gyro compass indicates the resultant rotation to which it is subjected by virtue of the fact that it is on the ship as well as on the earth, so that the axis of the gyro turns to a position perpendicular to OP instead of to a position perpendicular to OC.

The angle COP is therefore the speed error of the compass. The error is naturally measured from the correct direction to the erroneous one, i. e., from OC to OP, and in the same sense in which course angles are measured, i. e., clockwise. It follows that whenever the course has a positive northerly component as in Fig. 1 the error E is negative, and the angle COP, if measured anticlockwise, is —E. For a course with a positive northerly component the gyro axis has a negative error, i. e. it becomes aligned in a direction to the west of north: for a course with a negative northerly component, i. e., a southerly component, the error is positive and the gyro axis has a positive error and it becomes aligned in a direction to the east of north.

The ship's speed S has always two components, a northerly one, (positive or negative) and an easterly one (positive or negative). In Fig. 1 these are CP' and P'P. Previous correctors have neglected the easterly component and have calculated the correction as if the ship had only the northerly component velocity CP'. This velocity is S cos C. Previous correctors, therefore, instead of being designed to correct the error COP, were designed to correct the supposed error COP', or —E', which is given by the formula $$\tan E' = -\frac{CP'}{OC}$$

(Here the negative sign takes account of the fact that the angle COP' in the figure is —E'.)

The correct formula is given by $$\tan E = \frac{-PM}{OM}$$

where PM is perpendicular to OC, so that CM=S sin C.

Consequently $\tan E = \dfrac{-S \cos C}{V \cos L + S \sin C}$

In the methods herein shown for mechanically calculating this correction we set up on some suitable scale a physical embodiment of the sides CP and OC of the velocity triangle COP, and we maintain these sides in the correct angular and scale relationship as the ship changes its course. Thereby the angle COP may be picked off the mechanism and used for correction purposes.

We may construct our physical embodiment to represent the velocity triangle on the same scale in all latitudes, but we have only shown in the drawings the method in which the scale of representation is changed with latitude in such a way that OC remains constant in all latitudes. The geometrical relationships are shown in Fig. 2. Here OC is taken of some fixed length indicated as unity, and CP on the same scale is $$\frac{S}{V \cos L}$$

Clearly the triangle of Fig. 2 represents the triangle of Figure 1 on a scale inversely as V cos L.

Figure 7:
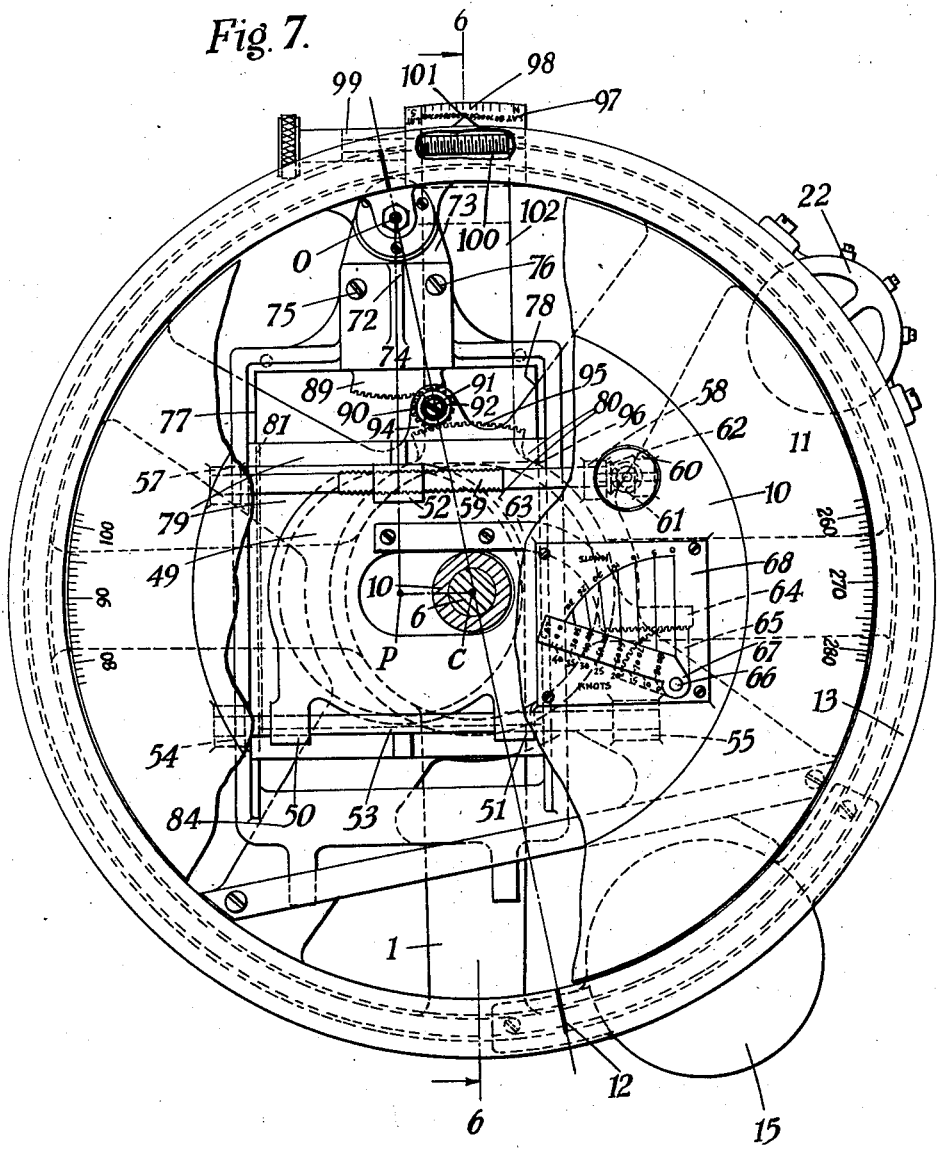
Figure 7 is a plan view of this compass with the compass card in part broken away to show details of the corrector mechanism.

Figure 2 is drawn for a northeast course of the ship, for which Figures 3 and 4 are also drawn, whereas Figures 6 and 7 are drawn for a course slightly west of north. Incidentally in Figure 2 there is also shown the triangle COP₂ for a ship travelling on a NW. course at the same speed as that for which triangle COP is drawn. This shows clearly the difference for the same speed in the errors on a NW. course and on a NE. course, ignored in the older formula.

From Figures 1 and 2 it is evident that the angle OCP, between the members that physically represent the vectors OC and CP, must be 90°+C where C is the course angle measured from the true north and not from the gyro axis.

Referring to Figures 3 to 6, we will now describe the operation of some devices in accordance with our invention as applied to one particular type of compass. We start with an explanation of those features of the compass, an understanding of which is necessary in order to appreciate the operation of the devices.

In these figures, 1 is the main supporting frame of the compass. This frame is itself supported in gimbal rings (not shown) from a binnacle or similar structure fixed to the deck of the ship, so that it is directionally locked to the fore and aft line of the ship.

Bearings 2, 2' are provided in this frame to support the inner or turning member of the compass with freedom of rotation about a vertical axis. The inner member is shown as being of the type in which a sensitive element is supported in a following or phantom element. Thus in the figures, the gyroscope rotor case 3 is supported for oscillation about a horizontal east-west axis (not shown) in a vertical ring 4, whose plane is the east-west vertical plane.

The ring 4 hangs by a suspension 5 from parts supported by a stem 6 solid with a ring 7, which is supported in turn in the bearings 2, 2'. To this ring 7 is attached a gear frame 8 on which are cut the teeth of the azimuth gear 9. Rigidly secured to the stem 6 is the hub 10 to which is fixed the compass card 11 carrying a scale of degrees. On this scale the ship's heading is read opposite a lubber mark 12 on a lubber ring 13. The rim of this ring rests on the rim of the main compass frame 1. The rim of the main frame 1 is supported on four radial arms from the centre, and the rim of the lubber ring 13 is supported on four radial arms from its hub. This hub is mounted on bearings 14 on the main frame, so that the lubber ring can rotate round a vertical axis on the main frame. Since the ship's course is to be read by the relative position of the card 11 and the lubber mark 12, it is important to observe how this relative position is determined.

On the compass frame 1 is attached a motor 15 which drives the azimuth gear 9 through gearing shown as 16, 17, 18. This motor is controlled by some system shown in Figure 6 as a contact wheel 19 on a member 21 mounted on the vertical ring 4. The contact wheel runs over contacts 20 carried on the phantom ring 7 whenever there is relative movement between the two rings. The motor 15 is thereby so controlled as always to drive the gear 9 in the appropriate direction to make the plane of the phantom ring 7 coincide with that of the vertical ring 4. The compass card 11 turns with the ring 7 and so is always in a fixed directional relationship with the ring 4, and therefore with the axis of the gyro. The card is so marked out that 360° corresponds to the north end of the gyro axis.

From the above it is evident that the 360° mark will always be driven into a position in space corresponding to the direction of the gyro axis, and it will therefore be subject to the speed errors of the gyro itself. Thus, if the ship is proceeding on a course with a northerly component, the 360° mark will not be due north of the compass centre but will be displaced anti-clockwise to the west. In order to be able to read the true course as measured from the true north instead of from the 360° mark on the card, the lubber mark must also be displaced anti-clockwise by the same amount. This is brought about by a rotation of the lubber ring as a whole by the corrector mechanism.

All the above is already known and forms no part of the subject matter of our invention. Our invention is concerned with a corrector mechanism which can be used, inter alia, to act as the corrector for the above type of compass so as to displace the lubber ring 13 on the main frame 1 by an amount equal to the correction angle. However, it must not be supposed that our invention is restricted to the application of correction by displacing the lubber ring.

It may be remarked that in British Patent No. 433,494 there is described a compass in which correction is employed not by moving lubber ring 13 on main frame 1 but by moving the azimuth gear 9 on the phantom element 7. Our invention is equally applicable to correction applied between these two members, or to correction applied elsewhere.

Returning to Figures 3 to 6, it is important to observe that if correction is applied by rotating the lubber ring through a correction angle equal to the compass error, then the two members on the compass between which the true course angle makes its appearance are the lubber ring and the phantom element. It is for this reason that, if transmission to repeater compasses is used from the compass, the transmitters are mounted on the lubber ring. Thus, the transmitter 22 is mounted on lubber ring 13 and its shaft engages by means of gearing shown as 23, 24, 25 with the azimuth gear 9. The rotation given to the transmitter shaft is therefore proportional to true changes of course provided that the speed correction imparted to the lubber ring 13 is equal to the speed error of the phantom element 7 inclusive of the azimuth gear 9 driving the transmitter.

For the same reason, in compasses employing correction by movement of the lubber ring, we mount our corrector on the lubber ring whereas previously such correctors have been mounted on the main compass frame. By mounting the corrector on the lubber ring we ensure that when the ship changes course, the phantom element turns with respect to the corrector through the true change of course angle.

The first form of our corrector is shown in Figures 3, 4, 5. In these figures the lubber ring 13 is shown as provided with a boss 26, in which is journalled a shaft 27 fixed at the upper end to a disc 28 and at the lower end to a disc 29. This disc carries a circular flange 30 on which teeth are cut around the whole circumference. The gear 30 so formed is driven from a gear 31 of equal diameter fixed to the azimuth gear 9, the drive being by means of an idler gear on a shaft 33 journalled in the lubber ring 13. From the nature of the gearing it is evident that the disc 29 turns relatively to the lubber ring through the same angle as that through which the gear 31 turns relatively to the lubber ring. Since gear 31 is part of the phantom element it follows that the angular rotation of disc 29 relative to the lubber ring 13 is the true angular change of course.

The disc 29 extends below the gear flange 30 in a body part which is machined through to leave two walls 30', 30" (Fig. 5) shown dotted in Figure 4. These are slotted at 33', 34 to form a slide bearing for a slide carriage 35 from which there projects downwards a pin 36. To the upper part of the slide carriage 35 there is secured a straight rack 37 with vertically cut teeth which engage with a pinion 38 on a shaft 39 journalled in the shaft 27.

To the upper end of shaft 39 is rigidly attached the disc 40 which is counterbored on the under side so that the disc 28 fits inside it. The cylindrical surface of the disc 40 is knurled to afford a grip and at one point a tapped hole passes through it in which is located a locking screw 41 which can be screwed forward so that its point engages between teeth 42 cut on the disc 28. A window 43 is cut in the upper surface of the disc 40 through which can be seen a circular scale 44 engraved on the top surface of disc 26. An index line 45 is engraved on 40 opposite the centre of the window.

The disc 40 is the setting knob for the corrector. It is by means of it that the corrector is set for the speed and latitude of the ship. To set the knob a chart is first consulted: this indicates what scale number corresponds to any speed and latitude of the ship. When the scale number is found, the locking screw 41 is released, and disc 40 is turned by hand until the scale number appears in the window 43 opposite the index line 45. The locking screw 41 is then screwed home into engagement between the teeth 42 so that thereafter no relative motion is permitted between shafts 27 and 39 which turn together as a single shaft in the bearing in boss 26 whenever the ship changes course.

During the process of setting the disc 40 relative to disc 42, the shaft 27 is prevented from turning owing to the engagement of gear 30 with gear 32 which is in turn geared with the gear 31 which is held fixed by the azimuth motor 15. Shaft 39 therefore rotates in shaft 27 and turns pinion 38 thereby driving carriage 35 along the slide bearings 33', 34, by means of rack 37. In this way the pin 36 is displaced from the centre line of shaft 39. The scale 44 and the charts of speed and latitude according to which this scale is set are so made out that the displacement CP of pin 36 from the axis of shaft 39 is proportional to $$\frac{S}{V \cos L}$$

on the same scale as the distance OC of the axis of shaft 39 from the vertical axis of the compass is proportional to unity.

Referring to Figure 4, it is evident that the triangle OCP corresponds to the triangle OCP of Figure 2, or rather to its mirror image, for OC is a constant distance, CP is $$\frac{S}{V \cos L}$$

times as great, and the angle OCP is the true course angle (provided that the lubber ring 13 is in fact subjected to a correctional movement relative to the compass frame 1 through an angle equal to the compass error).

It follows that the angle COP in Fig. 4 is equal to the compass error.

In order to move the lubber ring 13 on the compass frame 1 through an angle equal to the angle COP a bracket 46 is secured to the underside of the compass frame 1, and this is slotted at 47 to 48, the slot being in a vertical radial plane passing through the vertical axis of the compass. The pin P engages with this slot, so that the centre line of this slot forms the third side OP of the triangle COP of Figure 2. In this way the angle between the line OC on the lubber ring 13 and the line OP on the main frame 1 is caused to be the true error angle.

As the ship changes course, the phantom element 7 turns relatively to the main frame, and gear 31 drives gear 32, and thereby rotates the crank arm CP about the centre C. The pin 36, however, is always in engagement with the slot 47 or OP, so that the lubber ring 13 is pushed round on the main frame 1 to provide a compass correction in accordance with the desired formula.

It will be appreciated that the distance OC on the lubber ring, the distance CP on the adjustable rotating crank and the distance OP on the main frame, are a physical embodiment of the corresponding lengths of Figure 2 or of Figure 1 on a special scale.

Figures 6 and 7 show another form of our invention applied to produce compass correction in the same way by moving the lubber ring 13 on the main frame 1 of the same type of compass.

In this form also a physical embodiment of Figure 2 is set up, but the triangle OCP now has the point O at the circumference of the lubber ring instead of at the compass centre, and the adjustable rotatable crank CP rotates about the compass centre C instead of about a centre at the circumference of the lubber ring. In fact this crank is formed on the compass card and turns rigidly with it about the vertical axis of the compass. Thereby the angle through which it turns relative to the line OC on the lubber ring is the true course angle. In Figure 7, although most of the compass card 11 is broken away to show the corrector parts, it may be seen that the course angle that would be read on the card opposite the lubber mark 12 is about 350° corresponding to a course about 10° west of north. The figures have been drawn showing this course, because for the length CP chosen for the crank arm, a course angle of about 350° makes the angle OPC a right angle and therefore, as is evident from Figure 2, produces the maximum error angle for the length CP.

The pin 36 of Figures 3 and 4, the distance of whose centre from the axis C determines the crank arm length CP is replaced in the corrector of Figures 6 and 7 by a large eccentric 49 surrounding the stem 6 of the phantom element and the lower part of the hub 10 of the compass card, which is rigidly attached to the stem 6. The eccentric is, of course, the mechanical equivalent of the pin, being a pin whose radius is larger than the crank arm radius.

The eccentric is provided with three bosses 50, 51, and 52. A rod 53 fixed to bosses 54, 55 solid with the hub portion 10 of the compass card, passes through the bosses 51, 50 of the eccentric and forms a slide bearing along which the eccentric as a whole may slide relatively to the compass card and parallel to the axis of the rod 53. A similar rod 56 parallel to rod 53 passes through boss 52 and prevents the eccentric from rotating about the axis of rod 53. Rod 56 differs from rod 53, however, in being not fixed but rotatably mounted in bearings in the bosses 57, 58 on the hub portion 10 of the compass card. Moreover, the central portion 59 of rod 56 is threaded and so is the boss 52, with the result that rod 56 and boss 52 act as a screw and nut. Rotation of rod 56 therefore feeds the whole eccentric 49 along slide rod 53. A knob 60 above the hub portion 10 of the compass card is provided to rotate the rod 56 by means of bevel gearing 61, 62.

In order to indicate the distance CP by which the eccentric 49 is displaced from the zero concentric with the vertical axis C of the compass, a member 63 is secured to the eccentric 49 and on it are cut vertical teeth to form a straight rack 64. This rack engages with a member 65 shaped as part of a circular rack and solid with a vertical shaft 66 journalled in the hub portion 10 of the compass card. To this shaft there is secured an index lever 67 marked out with a scale of latitudes. When the eccentric is moved by the knob 60, rack 64 causes the circular rack 65 to turn about the axis of shaft 66 and causes the index lever 67 to rotate about this axis. The index lever in its rotation passes over an index plate 68 marked out in curves of knots. The latitude scale and the speed curves are so drawn that, when a given latitude L is set to intersect the curve for a given speed S, the displacement CP of eccentric 49, which has brought about this intersection, is equal to OC multiplied by $$\frac{S}{V \cos L}$$

In this way the arm CP is made of the correct length relative to OC in accordance with the principles of our invention, so that there remains only to be explained how the correct error angle COP is picked off the device, and used to apply a correction by shifting the lubber ring 13 round the compass frame through an angle equal to triangle COP.

We first provide a member continuously directed along OP even when OP turns relative to the fixed line OC on the lubber ring 13. For this purpose we provide a pivot at O. A stud 69 is fixed into a boss 70 on the lubber ring 13, and this forms the inner race for the fulcrum bearing 71 for a lever member 72. This lever is in two parts 73 and 74 screwed together at 75, 76, and dowelled, so that they pivot together as a single solid lever about the axis O of stud 69.

The upper portion 74 is constructed as a rectangular framework which is machined through to form a wide slot with parallel vertical walls 77, 78. This slot corresponds to the slot 47—48 in Figure 4 since the centre line of this slot is constrained to pass through the centre P of the eccentric 49 by the engagement of the eccentric in the slot.

In order to reduce wear the eccentric 49 does not contact directly with the walls 77, 78 of the slot. Instead, two slide blocks 79, 80 are interposed between the eccentric and these two walls respectively.

Slide block 80 has a plane face resting on wall 78 and a concave cylindrical face resting on the cylindrical face of the eccentric. Slide block 79 has also a concave cylindrical face resting on the cylindrical face of the eccentric, but it has no face in contact with the plane wall 77. Instead a plate 81 loosely connected to it and sprung from it engages against this wall 77. Thereby the necessity for accurate fittings is avoided, shake is prevented, and wear is taken up. The slide block 79 has fingers 82, 83 extending from it into slots in the slide block 80 so stabilizing the blocks against rocking movements about axes parallel to OP.

The total effect is that the lever 72 as a whole engages without shake on the eccentric 49, and is oscillated relatively to the lubber ring 13 by the eccentric as this rotates with the compass card round the vertical axis of the compass. The angle COP through which it oscillates is the true error angle as exhibited in Figure 2.

In order to form a guide for lever 72 as a whole for its oscillation about the pivot O so as to prevent it from rocking or tilting, a flange 84 with two lugs 85, 86, is formed on the end of the frame 74 remote from the pivot O. These slide over a machined surface on a bridge piece 87 across two of the radial arms of the lubber ring, being held down on it by a bar 88.

In order to rotate the lubber ring 13 on the main frame 1 through an angle equal to the angle COP through which the lever 72 oscillates on the lubber ring, gearing is provided.

Teeth 89 are cut on the lower portion 73 of the lever 72. These engage with a pinion 90 on a shaft 91 which turns in bearing 92, 93 in a boss 94 on the hub of the lubber ring 13. The pinion 90 in turn engages with a gear sector 95 of the same radius as that of gear sector 89. This gear sector 95 is cut on a circular plate 96 which may be considered as solid with the main frame 1 of the compass.

When the lever 72 is oscillated relative to the lubber ring 13 through the angle COP, it turns pinion 90 through an angle relative to the lubber ring proportional to the angle COP and this causes gear sector 95 to turn relative to the lubber ring through the same angle COP. However, since gear sector 95, is fixed to the main compass frame, this relative movement takes effect as a rotation of the whole lubber ring on the compass frame through an angle equal to the angle COP, thereby providing the compass correction required.

In Figures 6 and 7 we also show how we ensure that the speed correction provided by our corrector remains correct when latitude damping error is also corrected. As is well known in the art, a damping error is present in many types of compasses, which damping error varies with latitude. The damping error, in the type of compass described, is corrected by moving the lubber ring, in the same way as is the speed error. Consequently, when the correction is made, the true course angle is that between the lubber ring 13 and the phantom element 7. This is the angle that must be used between the lines OC and CP of the elements of the corrector. It follows that the line OC must be fixed in the lubber ring 13.

For this reason we do not apply latitude damping correction between the speed corrector and the lubber ring as has been the practice heretofore. Instead we apply latitude damping correction between the speed corrector and the main compass frame by rotating the gear sector plate 96 with respect to the main compass frame.

For this purpose a block 97 is fixed to the main frame 1 which carries a scale 98 marked out in latitudes and which forms the bearing support for an adjustment screw 99. Engaging with this screw there is a worm sector plate 100 on which is carried a pointer 101 moving over the scale 98 to indicate the latitude for which adjustment of the damping error is made. The scale is so marked out that the plate 100 turns about the compass centre through the damping error angle corresponding to the latitude indicated.

The plate 100 is rigidly connected to the plate 96 so as to position it in azimuth. In the figures the connection is shown as a broad stepped spring plate 102 which is rigid in azimuth but acts as a thrust spring radially so forcing the plate 100 into engagement with the thread of the adjusting screw 99 and preventing shake.

When the pointer 101 is set to a given latitude the gear sector 95 is therefore set round on the compass frame through an angle equal to the damping error, and as a result the whole correction mechanism including the lubber ring is given a correction equal to this error. The internal angular relations of the parts of the speed corrector device itself are, however, correct in spite of the application of the damping error.

We have described above the operation of our corrector as applied in two forms to a gyro compass. Clearly, however, it can be applied to a repeater or dummy compass operated by transmission from an uncorrected gyro compass to generate corrections which can be applied to transmitters to re-transmit corrected angles. Our invention extends to this use. The correction when obtained may be set in by any suitable method such as by mechanical or electrical differentials.

Many other embodiments of the invention are also possible.

What we claim is:

1. In a correction device for gyro compass apparatus, the combination with a rotatable compass member, a lubber ring member adapted for reading with said compass member, means for turning one of said members with respect to the other through the speed error correction angle of the compass, said means comprising an element pivoted upon said lubber ring member and turnable on its pivot with respect to said lubber ring member, a settable indexing member connected for causing the turning of said element in accordance with speed and latitude, and gearing cooperable with said element for effecting in conjunction therewith the bodily shifting of one of said members through the desired speed error correction angle as said indexing member is operated.

2. In a correction device for gyro compass apparatus, the combination with a rotatable compass member, a lubber ring member adapted for reading with said rotatable compass member, means for turning one of said members with respect to the other through the speed error correction angle of the compass, said means comprising an element pivoted upon and turnable with respect to said lubber ring member, an indexing member connected for causing the turning of said element, gearing cooperable with said element for effecting in conjunction therewith the bodily shifting of one of said members through the desired speed error correction angle as said indexing member is operated, and means cooperating with said gearing for automatically changing the relative angular positions of said compass and lubber ring members as the course of the craft carrying the compass varies.

3. In a correction device for gyro compass apparatus, the combination with a rotatable compass card member, a reference member providing a lubber mark adapted for reading with said rotatable card member, and mechanism for turning one of said members with respect to the other through the speed error correction angle of the compass, said mechanism comprising a turnable lever element pivoted on said reference member at a radial distance removed from the central axis of the compass a length corresponding to the diurnal velocity of a point on the earth's surface at the latitude of the craft, indexing means connected for turning said lever element to establish a second length representative of the speed of the craft relative to the earth's surface, while simultaneously effecting the bodily shifting of one of said members through the proper speed error correction angle.

4. A correction device as defined in claim 1, having settable means cooperable with said gearing for effecting additional turning of said pivoted lever element to thereby also introduce latitude damping error.

5. In a navigational apparatus, a compass card, a lubber ring having a lever member pivoted thereon, the distance between the vertical compass card axis and the pivotal axis of said lever establishing a fixed length independent of latitude and representing in a velocity triangle a side corresponding to the diurnal velocity of a point on the earth's surface at the latitude of the craft, and indexing means for turning said lever member to thereby establish a length at the appropriate angle to the first length corresponding in the velocity triangle to the craft speed divided by the diurnal velocity of a point on the earth's surface at the latitude of the craft, and mechanism connected with said lever and operable in response to movement thereof for relatively shifting said compass card and lubber ring through an angle corresponding to the resultant speed error correction angle determined by the direction of the resultant velocity corresponding to the third side of the velocity triangle.

6. A navigational apparatus as defined in claim 5, having a transmitter mounted on said lubber ring.

7. In a navigational apparatus for use on ships or other vehicles, having a movable compass indicator, means associated with said compass indicator for correcting the indications thereof in accordance with changes both in speed and latitude of such ship or other vehicle, indexing means actuated by a single manual operation for actuating said first mentioned means, and further means cooperable with said first named means for automatically correcting the compass indications in accordance with the movements of said compass indicator corresponding to changes in course.

8. In a navigation apparatus for ships, a compass card, a lubber ring adjacent thereto, a correction device connected to a relatively fixed part of said apparatus and having connections with said card and ring, said connections being such that said device is adapted to angularly shift the position of said lubber ring in response to movements of said card, and manually operable indexing means cooperable with said connections for changing the relative positions of the parts of said device in accordance with the velocity and latitude of such ship to vary the amplitude of such shifting.

9. A navigation apparatus as defined in claim 8, wherein said corrective device functions on the principle of a velocity triangle, one corner of the triangle being in the vertical center line of the compass card, another on the axis of the lubber ring connection, and the third corner being adjustable eccentrically with respect to said first corner so as to be spaced therefrom a distance corresponding to the speed of the ship.

WILLIAM GEORGE HARDING.
ROBERT HAYES NISBET.